United States Patent
Mukherji et al.

(10) Patent No.: US 10,588,110 B2
(45) Date of Patent: Mar. 10, 2020

(54) LOCATION ACCURACY ASSESSMENT AND REMEDIATION FOR INDOOR POSITIONING SYSTEM DEPLOYMENTS

(71) Applicant: Cisco Technology, Inc., San Jose, CA (US)

(72) Inventors: Abhishek Mukherji, Milpitas, CA (US); Santosh Ghanshyam Pandey, Fremont, CA (US); Rong Peng, San Jose, CA (US); Vinay S. Raghuram, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/029,000

(22) Filed: Jul. 6, 2018

(65) Prior Publication Data

US 2020/0015189 A1    Jan. 9, 2020

(51) Int. Cl.
*H04W 64/00*    (2009.01)
*G06K 9/62*    (2006.01)
*H04W 24/02*    (2009.01)

(52) U.S. Cl.
CPC ........ *H04W 64/006* (2013.01); *G06K 9/6227* (2013.01); *G06K 9/6256* (2013.01); *H04W 24/02* (2013.01)

(58) Field of Classification Search
CPC ........ H04W 4/02; H04W 4/029; H04W 60/04
USPC ......... 455/456.1, 410, 411, 456.5, 457, 41.2, 455/424; 370/338; 705/7.19, 1.1; 709/313
See application file for complete search history.

(56) References Cited

U.S. PATENT DOCUMENTS

| | | | | |
|---|---|---|---|---|
| 2002/0129138 | A1* | 9/2002 | Carter | H04L 41/22 709/224 |
| 2014/0019596 | A1* | 1/2014 | Sharkey | H04L 67/306 709/219 |
| 2014/0187257 | A1* | 7/2014 | Emadzadeh | G01S 5/0242 455/456.1 |
| 2016/0050541 | A1* | 2/2016 | Youssef | H04W 4/043 370/338 |
| 2016/0302066 | A1* | 10/2016 | Niewczas | H04W 12/06 |
| 2016/0337978 | A1* | 11/2016 | Zappi | H04W 4/02 |

(Continued)

OTHER PUBLICATIONS

Potorti et al. "Comparing the Performance of Indoor Localization Systems through the EvAAL Framework" Oct. 13, 2017; pp. 1-28.

(Continued)

*Primary Examiner* — Kiet M Doan
(74) *Attorney, Agent, or Firm* — Behmke Innovation Group LLC; James Behmke (57) ABSTRACT

In one embodiment, a device determines that location accuracy performance of an indoor positioning system deployment is below a predefined threshold. The device obtains characteristic data for the indoor positioning system deployment. The device identifies, by using the characteristic data as input to a machine learning model, one or more contributing factors from the characteristic data for the location accuracy performance of the indoor positioning system deployment being below the predefined threshold. The device initiates a remediation action based on the identified one or more contributing factors for the location accuracy performance of the indoor positioning system deployment being below the predefined threshold.

19 Claims, 8 Drawing Sheets

(56) References Cited

U.S. PATENT DOCUMENTS

2017/0019769 A1* 1/2017 Li .............................. G01S 1/08
2017/0059715 A1* 3/2017 Wietfeldt ................. G01S 19/26
2017/0181115 A1* 6/2017 Kim ...................... H04W 60/04
2019/0086988 A1* 3/2019 He ........................ G06F 1/3234

OTHER PUBLICATIONS

Bin Hu "Wi-Fi Based Indoor Positioning System Using Smartphones" Master of Applied Science School of Mathematical and Geospatial Sciences RMIT University; Nov. 2013; pp. 1-91.
Mehmood et al. "Indoor Positioning System Using Artificial Neural Network" Journal of Computer Science 6 (10): 1219-1225, 2010; pp. 1-7.
Cisco Hyperlocation Solution—Unlock New Business Value Through More Accurate Context; pp. 1-6.
Cisco—Hyperlocation Deployment Guide; Nov. 19, 2015; pp. 1-65.
HyperLocation: Best Practices and Troubleshooting Guide; Dec. 16, 2016; pp. 1-17.
Mukherji "Location Accuracy Understanding and Remediation Assistant (LAURA)" pp. 1-23.

* cited by examiner

LOCATION ACCURACY ASSESSMENT AND REMEDIATION FOR INDOOR POSITIONING SYSTEM DEPLOYMENTS

TECHNICAL FIELD

The present disclosure relates generally to computer networks, and, more particularly, to location accuracy assessment and mediation for indoor positioning system deployments.

BACKGROUND

Indoor positioning systems generally operate to locate devices and/or people inside of a building. Such systems may use a wide variety of technologies to determine a location. For example, indoor positioning systems may rely on acoustic, optical, or radio signals, to pinpoint the location of a device within the building. In the specific case of computer networks, Wi-Fi signals, Bluetooth signals, and the like, can be used to determine the location of a wireless device in the building.

Currently, an ideal deployment of an indoor positioning system can achieve location accuracy between 1-3 meters. However, there are a vast number of factors that can cause the location accuracy of an indoor positioning system to be less than ideal. For example, varying floor plans, distances between wireless access points (APs), interference, and the like, can all impinge on the accuracy of a deployment. Once the system is deployed, however, collecting the requisite information to diagnose the issue, as well as identifying the root cause of the loss of accuracy, is particularly challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device determines that location accuracy performance of an indoor positioning system deployment is below is a predefined threshold. The device obtains characteristic data for the indoor positioning system deployment. The device identifies, by using the characteristic data as input to a machine learning model, one or more contributing factors from the characteristic data for the location accuracy performance of the indoor positioning system deployment being below the predefined threshold. The device initiates a remediation action based on the identified one or more contributing factors for the location accuracy performance of the indoor positioning system deployment being below the predefined threshold.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
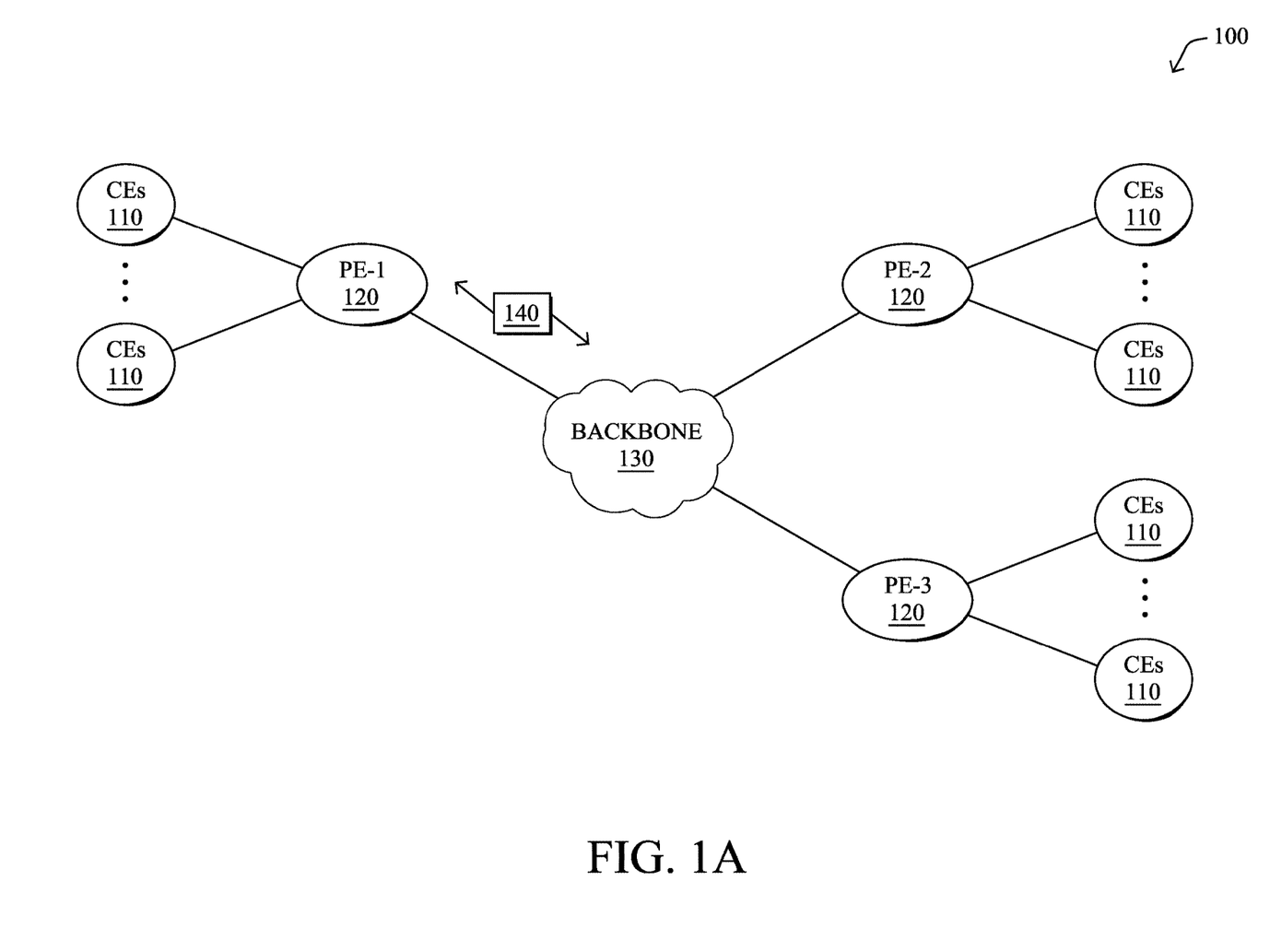
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
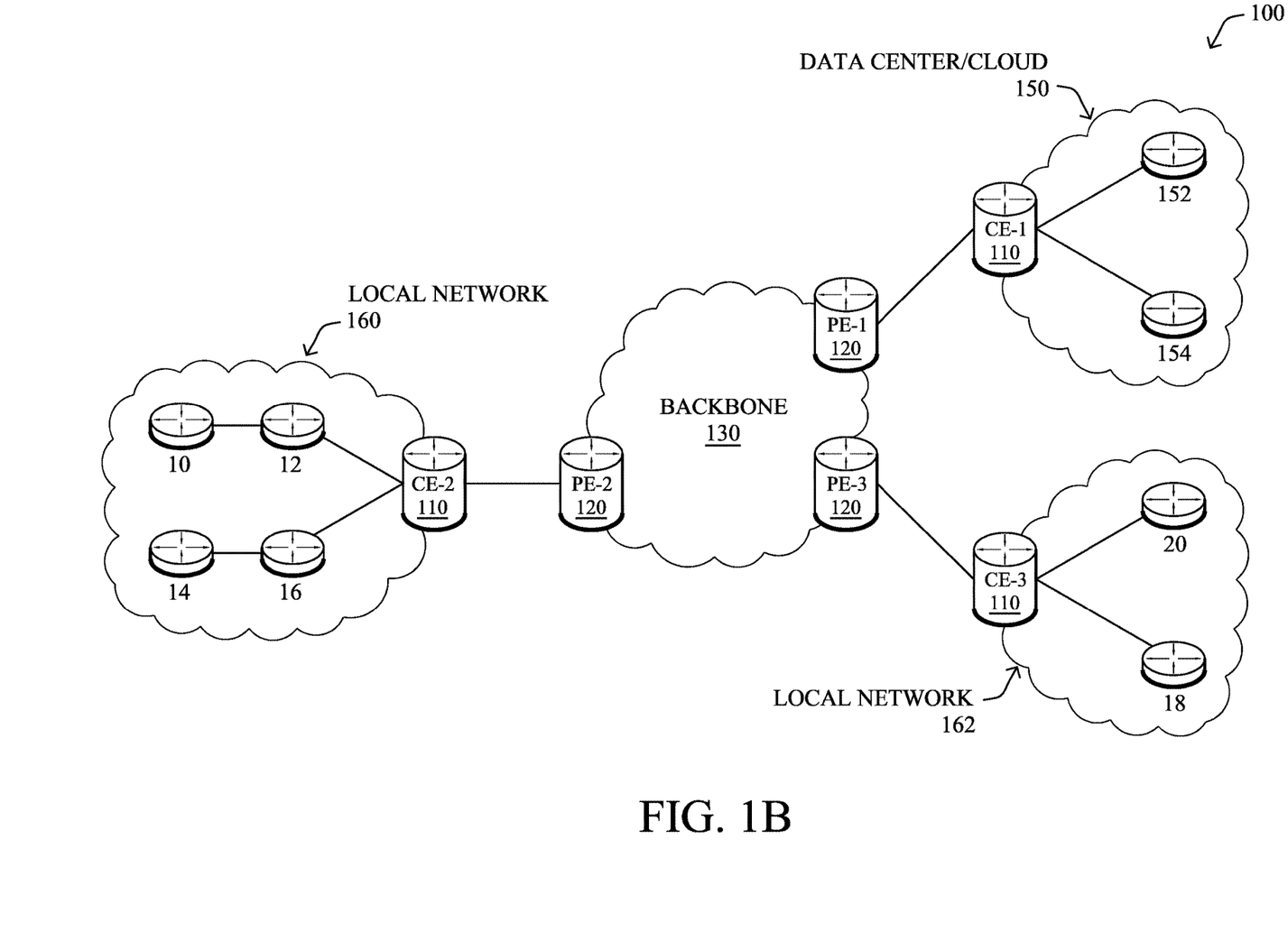

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a is network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal is changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
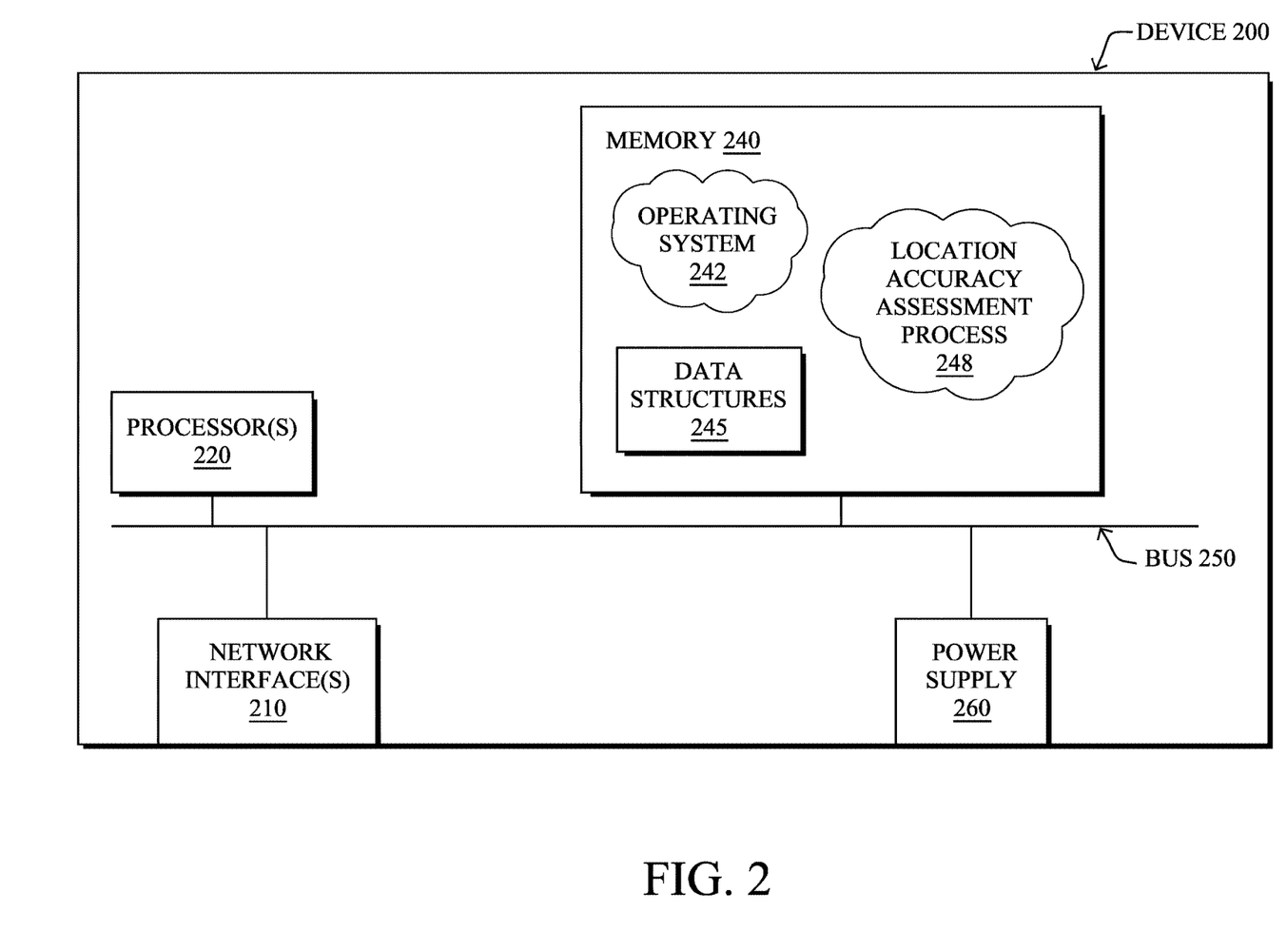
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), is portions of which are typically resident in memory 240 and executed by the processor(s), functionally organizes the node by, inter alia, invoking network operations in support of software processors and/or services executing on the device. These software processors and/or services may comprise a location accuracy process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Location accuracy process 248 includes computer executable instructions that, when executed by processor(s) 220, cause device 200 to perform location accuracy assessments and remediation as part of an indoor positioning system within the network. In some embodiments, location accuracy process 248 may use machine learning techniques, to assess the accuracy of the indoor positioning system and effect remediation measures, as needed. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of is misclassified points is minimal. After this optimization phase (or learning phase), the model M can be used very easily to classify new data points. Often, M is a statistical model, and the cost function is inversely proportional to the likelihood of M, given the input data.

In various embodiments, location accuracy process 248 may employ one or more supervised, unsupervised, or semi-supervised machine learning models. Generally, supervised learning entails the use of a training set of data, as noted above, that is used to train the model to apply labels to the input data. For example, the training data may include sample conditions that are labeled with their corresponding effects on the location accuracy of the system. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted poor location accuracy of the indoor positioning system. Conversely, the false negatives of the model may refer to the number is of times the model predicted good location accuracy when, in fact, the system exhibited poor performance. True negatives and positives may refer to the number of times the model correctly predicted good or bad performance by the system, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, an indoor positioning system may use any number of technologies, to determine the location/position of a device within the building. In some embodiments, the indoor positioning system may be implemented as part of the wireless network of the building. Accordingly, the indoor positioning system may rely on measurements such as received signal strength indicator (RSSI), angle of arrival (AoA), time of arrival (ToA), and the like, to estimate the location/position of a given device in the building of the deployment. Modern indoor positioning systems can achieve location accuracies of approximately 1-3 meters, in many cases.

To ensure that the location accuracy of an indoor positioning system deployment meets its expected accuracy, location accuracy logs can be collected at multiple locations on the floor map. For example, a mobile device may be transported by a technician or robot to various known locations throughout the building and measurements taken by the indoor positioning system with respect to the device. For example, the system may gather information regarding the RSSI(s), AoA(s), ToA(s), access point(s) (APs), antenna(s), floor plan, access point locations, and the like, to estimate the location of the device. The estimated locations can then be compared to the actual locations of the device, to determine whether the location accuracy performance of the system is within the expected range of performance.

The list of potential factors impacting or causing nonconformant accuracy in an indoor positioning system are numerous and may vary by deployment due to factors such as varying floor plans, AP-AP distances, and interference present in the environment. From the location computation/ estimation point of view, factors that impact accuracy include, but are not limited to, (i.) not receiving data from sufficient number of APs, (ii.) not receiving data from APs nearby the client device, (iii.) for AoA, receiving partial data, (e.g., not receiving data from all of 32 antennae of the APs), (iv.) AP placement and orientation anomalies, (v.) not having the conditions for optimal computation, and (vi.) particular channels having bad calibration with respect to AoA data. These factors, in turn, may also be caused by any technical issue in the data flow from the APs to AP controllers to the indoor positioning system.

Location Accuracy Assessment and Remediation for Indoor Positioning System Deployments The techniques herein introduce a location accuracy utility that can automatically identify the factors that impact the location accuracy of an indoor positioning system deployment. In some aspects, the techniques herein apply machine learning on the accuracy log data and provide insights about the factors that contribute to the non-conformant accuracy results. In further aspects, the utility may also rank the factors by their impact on the particular deployment. Further, the techniques also enable the automated collaborative learning of common factors across several deployments and without compromising privacy. From the multitude of uploaded logs, deployments can be grouped into various deployment types and common factors specific to deployment types are learnt. As a result, the analysis utility provides fully automated accuracy analysis that leverages knowledge across several accuracy logs, provides insights to the user on potential issues in their deployments, and also provides knowledge about common issues for the deployment types.

Specifically, according to one or more embodiments of the disclosure as described in detail below, a device determines that location accuracy performance of an indoor positioning system deployment is below a predefined threshold. The device obtains characteristic data for the indoor positioning system deployment. The device identifies, by using the characteristic data as input to a machine learning model, one or more contributing factors from the characteristic data for the location accuracy performance of the indoor positioning system deployment being below the predefined threshold. The is device initiates a remediation action based on the identified one or more contributing factors for the location accuracy performance of the indoor positioning system deployment being below the predefined threshold.

Illustratively, the techniques described herein may be performed by hardware, software, and/or firmware, such as in accordance with the location accuracy assessment process 248, which may include computer executable instructions executed by the processor 220 (or independent processor of interfaces 210) to perform functions relating to the techniques described herein.

Operationally, the techniques herein can be used to implement a utility that identifies factors that impact the accuracy of RSSI- and AoA- based indoor location computations in an indoor positioning system deployment. Such factors can include, for example, the quality of RSSI and/or AoA phase measurements from APs, the presence of a noisy RF environment, AP calibration issues, antenna calibration issues, and the like. In turn, the utility initiates a remediation action by report a list of these factors for review by a technician, by automatically implementing corrective measures (e.g., by instructing APs to use a different channel for positioning, etc.), or any other form of remediation action.

Figure 3:
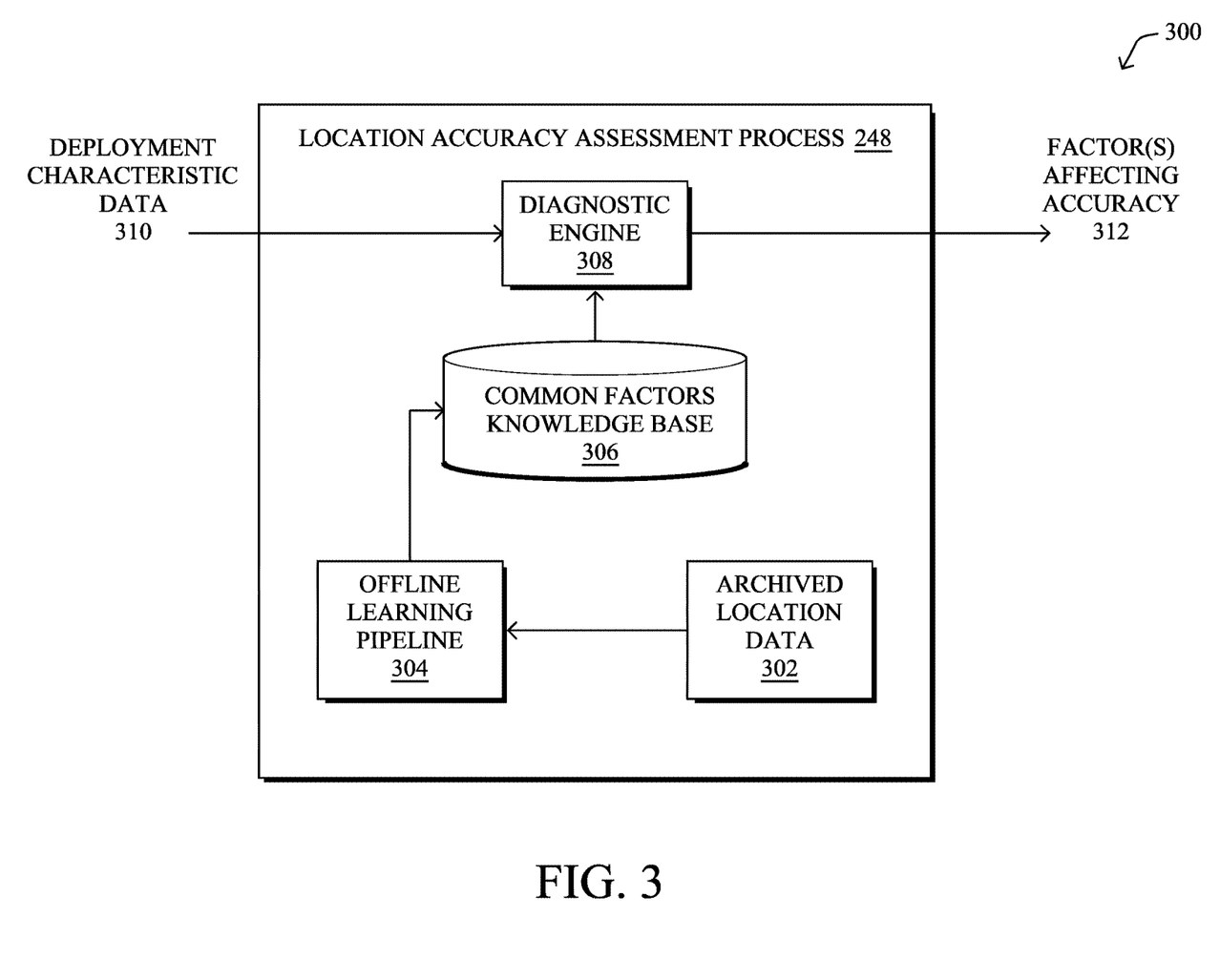
FIG. 3 illustrates an example architecture for assessing location accuracy.

FIG. 3 illustrates an example architecture 300 for assessing location accuracy, according to various embodiments. At the core of architecture 300 may be location accuracy assessment process 248, described previously, which comprises two key components: offline learning pipeline 304 and diagnostic engine 308. During operation, offline learning pipeline 304 may aggregate and analyze data (e.g., archived location data 302, etc.) from across different indoor positioning system deployments, in order to build a comprehensive knowledge base 306 of commonly seen factors that affect location accuracy.

During operation, diagnostic engine 308 allows users for a specific indoor positioning system to identify factors that affect the accuracy in their deployment. In some embodiments, diagnostic engine 308 may use leverage the common factors knowledge base 306 constructed by offline learning pipeline 304 to filter out noisy factors and/or elevate the importance of factors that are seen more often across different deployments. Notably, diagnostic engine 308 may receive as input deployment characteristic data 310 from the deployment of interest and, if the location accuracy performance of the deployment is below a threshold (e.g., the deployment is not able to locate a device within an accuracy of 1-3 meters), output the one or more factors 312 that are believed to be affecting this accuracy.

As would be appreciated, the components of architecture 300 may be implemented in a distributed manner across any number of devices or, alternatively, by a single analysis device. In addition, the functionalities of the components of architecture 300 may be combined, omitted, or implemented as part of other processes, as desired.

Figure 4:
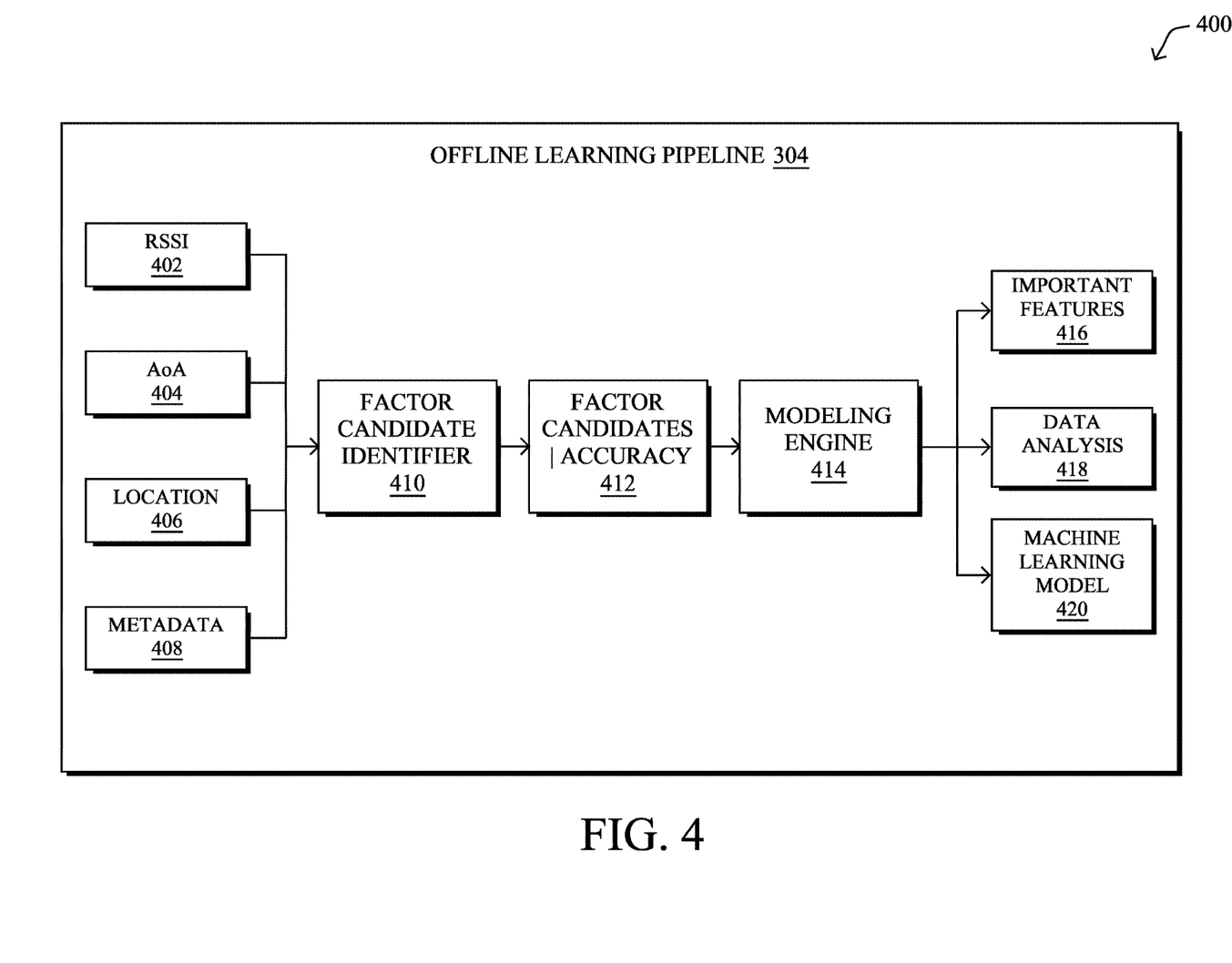
FIG. 4 illustrates an example learning pipeline architecture for assessing location accuracy.

FIG. 4 illustrates an example learning pipeline architecture 400 for assessing location accuracy, in various embodiments. As shown in architecture 400, offline learning pipeline 304 may comprise a plurality of sub-processes that operate to populate common factors knowledge base 306 shown in FIG. 3, using archived location data 302. Such archived data may be collected, for example, from any number of indoor positioning system deployments and include collected RSSI data 402, AoA data 404, location data 406, and/or other metadata 408 (e.g., floor plan information, wireless channel information, etc.). More specifically, offline learning pipeline 304 ingests data from multiple deployments with varying deployment configurations (e.g., AP placements, AP types, etc.) and environmental conditions (e.g., floor plan, signal interference, etc.).

Figure 5:
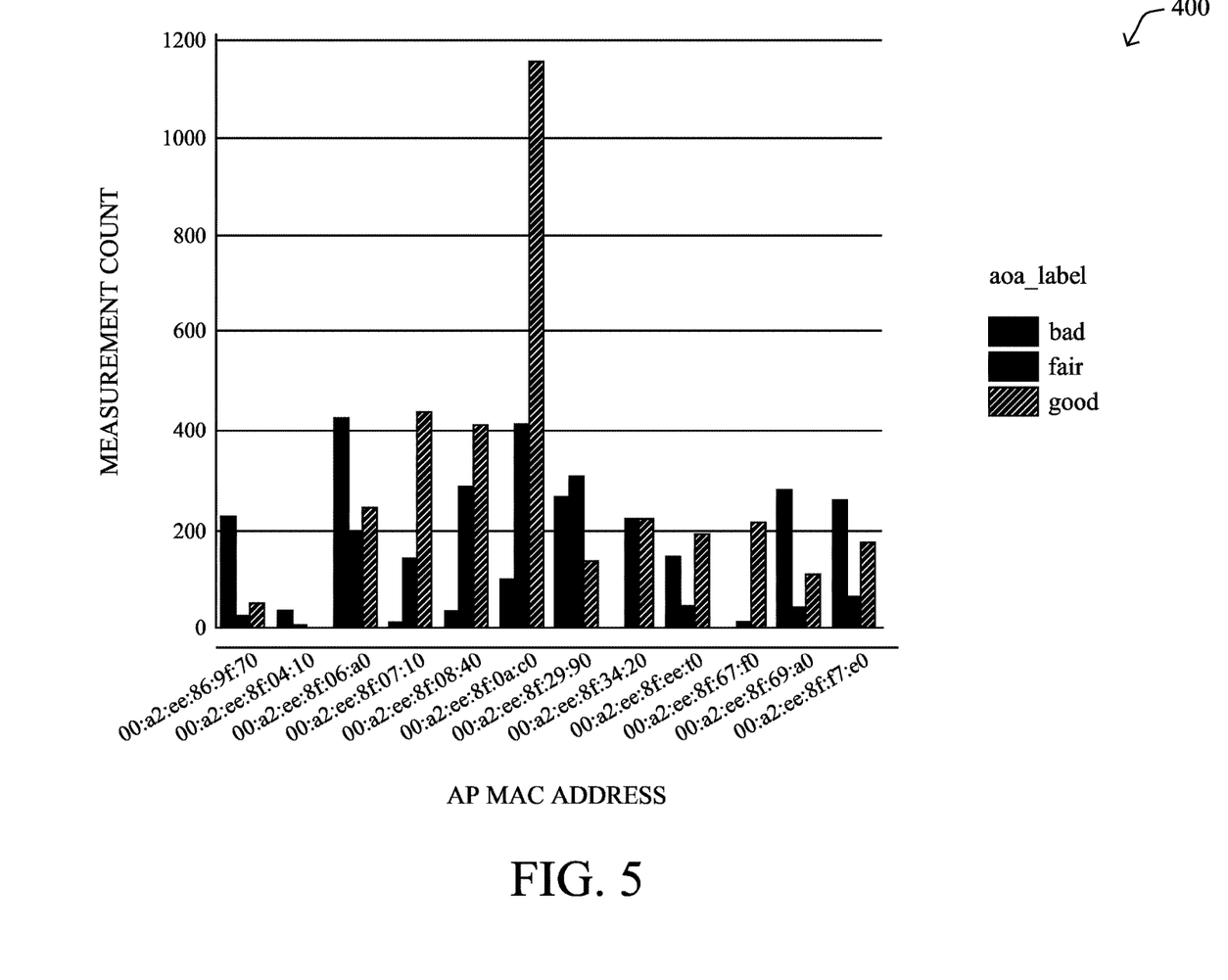
FIG. 5 illustrates an example of labeled characteristic data.

Based on the input data 402-408, factor candidate identifier 410 may categorize location computation outcomes from the deployments as categorized as "good," "fair," or "bad," based on predefined accuracy thresholds. For example, plot 500 in FIG. 5 illustrates an example of the labeling of AoA-based location estimates by AP MAC address. In particular, each location measurement by a deployment can be compared to the known device locations during testing and be labeled according to how close the measurements are to the expected. For example, if the measurements are within 1-3 is meters of the actual device location, they may be labeled as "good," if the measurements are between 3-4 meters of the actual device location, they may be labeled as "fair," and measurements outside of 4 meters of the actual location may be considered to be "bad." Of course, other thresholds and/or labels can be used, as desired, depending on the expected accuracy of the deployment.

Referring again to FIG. 4, facets of data 402-408 that could affect the location accuracy are identified and tagged by factor candidate identifier 410, resulting in a data subset 412 of the characteristic data 402-408. In some embodiments, each facet may include multiple factors that occur together or are otherwise related (e.g., the channel number, RSSI distribution, location measurement errors, etc.). For example, factor candidate identifier 410 may identify those changes in the factor values that may be correlated with the labeled location accuracy performance. Said differently, factor candidate identifier 410 may identify an exhaustive set of factors that may be responsible for the different accuracy labels.

In various embodiments, offline learning pipeline 304 may also include a modeling engine 414 that is configured to use machine learning on the factor candidate subset 412, to identify important features 416, perform data analysis 418, and/or train a machine learning model 420, for inclusion in common factors knowledge base 306 in FIG. 3. In one embodiment, modeling engine 414 may employ methods to determine the most appropriate model and hyper-parameters, to discover the strongest linkage between the factors and the accuracy tags. Once a model is trained by modeling engine 414, the model may be reverse-engineered to determine the relative importance of some factors over the others in impacting the accuracy of a measurement. According to various embodiments, modeling engine 414 may do so using two types of analysis: 1.) coarse-grained analysis and 2.) fine-grained analysis.

To perform coarse-grained analysis, modeling engine 414 may identify general trends associated with poor location accuracy using unsupervised learning and/or other analytical techniques. For example, modeling engine 414 may calculate the number of "good," "fair," and "bad" accuracy readings grouped by AP, in order to determine if any particular APs may be misbehaving. For example, in plot 500 in FIG. 5, some APs have very high counts of "bad" accuracy readings, but also tend to have relatively few "good" readings. This means that clients associated with these APs tend to have relatively bad location accuracy outcomes. In various embodiments, modeling engine 414 may use association rule mining, to identify those feature(s) that are frequently associated with bad accuracy readings. For example, modeling engine 414 may identify that the use of wireless channel 40 is frequently associated with bad AoA location accuracy readings.

In some cases, modeling engine 414 may train multiple types of machine learning models and select model 420 as the model with the best performance in terms of precision or recall. For example, during prototyping, a random forest classifier, a K-nearest neighbors (KNN) classifier, a decision tree classifier, a Naïve Bayes classifier, and a support vector machine (SVM) classifier. By running a 10-fold cross validation of these models, the random forest classifier and decision tree classifier both exhibited the best performance, with the random forest classifier performing slightly better than the decision tree classifier. However, a decision tree classifier may be better suited to most implementations, as these types of classifier are more interpretable by a human and easier to reverse engineer. Modeling engine 414 may also control the tree depth, when decision tree classifiers are used. For example, preliminary testing indicated that model performance did not significantly change beyond a tree depth of 24.

To perform the fine-grained analysis, modeling engine 414 may use supervised learning on the dataset from a specific deployment to learn the best hyper-parameters for model 420. For example, modeling engine 414 may use a grid search approach to select the best hyper-parameters for the decision tree model. The model is trained and then reverse-engineered, to determine the most important features 416 affecting location accuracy. The resulting deployment-specific model can then be used as part of the diagnostic engine (e.g., engine 308) to analyze the characteristics of the deployment and, in turn, identify those factor(s) that are most likely to affect the location accuracy performance in the deployment.

By running similar machine learning methods as above, but omitting factors that are deployment-specific (e.g., associated AP, etc.), modeling engine 414 may develop a set of common/important features 416 which are associated with poor accuracy, regardless of the deployment. Once these features 416 are learned for a specific set of data, they can be stored in common factors knowledge base 306 which, over time, becomes more and more comprehensive.

Referring again to FIG. 3, as noted, the purpose of offline learning pipeline 304 finding common factors is to build a knowledge base 306 that can be used to troubleshoot problems in any new deployments, as well as to refine the results of the diagnostic engine 308. Certain factors, such as particular malfunctioning APs, may be relevant in a single deployment, but irrelevant across deployments. Such factors are eliminated from the common factor analysis. These findings are augmented with data from common factors knowledge base 306, which can be used to up-weight more widely seen factors, or down-weight factors that may be noisy, in various embodiments.

Figure 6:
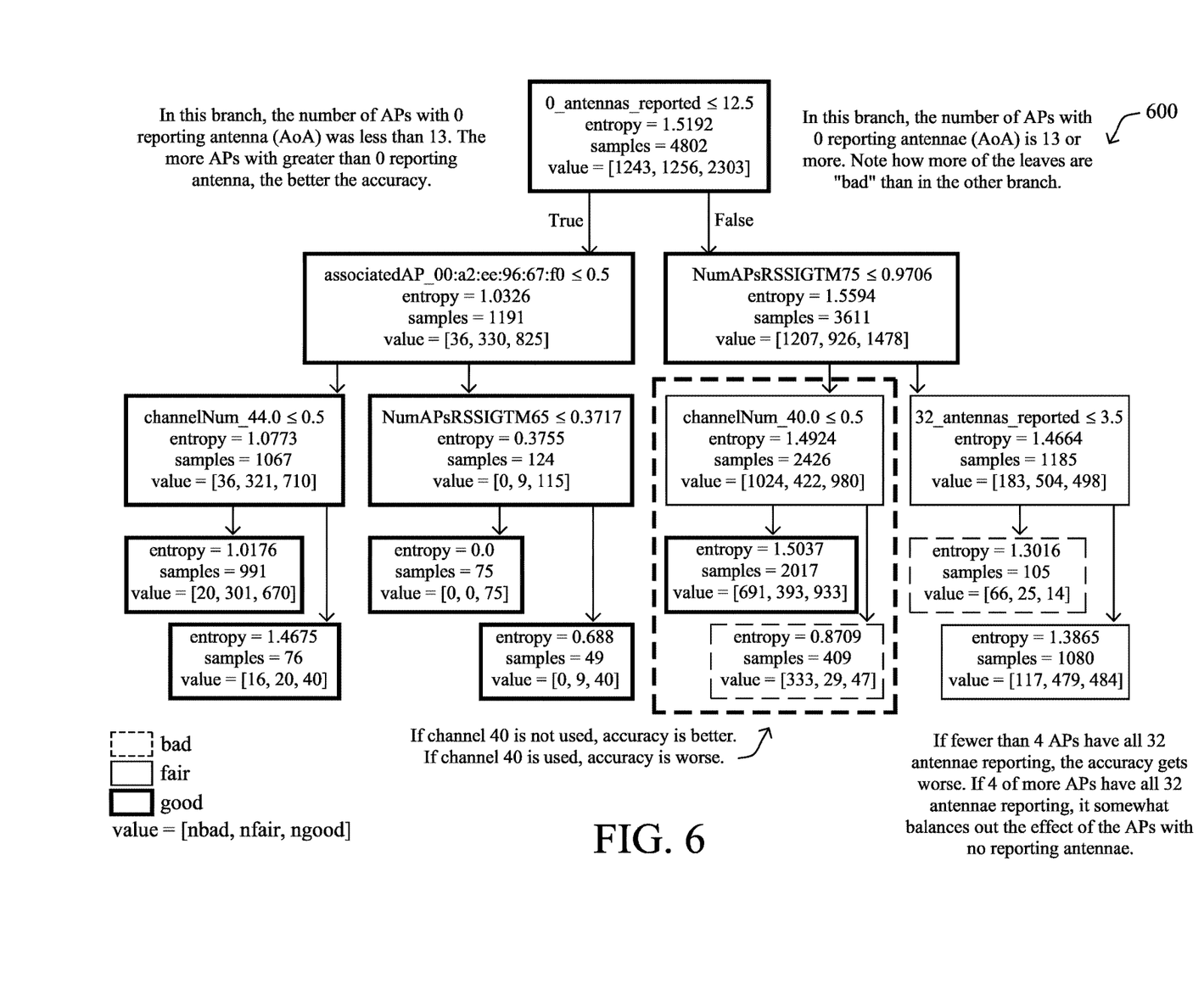
FIG. 6 illustrates an example machine learning model for a location accuracy assessment process and FIG. 7 illustrates an example simplified procedure for performing location accuracy assessment and remediation for an indoor positioning system deployment.

FIG. 6 illustrates an example machine learning model 600 for a location accuracy assessment process, according to various embodiments. As shown, model 600 is a decision tree classifier that can be constructed using the techniques herein (e.g., by offline learning pipeline 304), with each node representing a set of features, such as AP, number of accuracy samples taken, wireless channels, number of antennae reporting per AP, and the like. In addition, the accuracy labels that are associated with these sets of features may also be assigned to each of the nodes. From model 600, which is a simplified view of a much larger decision tree model, it can be seen that if the number of APs with no reporting antennae is thirteen or more, then location accuracy performance is "bad." However, accuracy under this condition actually improves somewhat when wireless channel 40 is not used. Another insight from model 600 is that if fewer than four APs each have all of their 32 antennae reporting, the accuracy actually decreases, but somewhat balances out the effects of the APs with no reporting antenna. Finally, if the number of APs with zero reporting antennae are less than thirteen, the location accuracy performance was "good," meaning that the more APs with greater than zero reporting antennae, the better the accuracy.

Referring yet again to FIG. 3, location accuracy assessment process 248 may use the identified factor(s) 312 that affect location accuracy performance in the deployment under scrutiny to initiate a remediation action. In one embodiment, process 248 may output the identified factor(s) 312 to a user interface, to allow a technician or other user to implement changes to the deployment. For example, if a particular AP has been identified as the cause of the poor location accuracy performance in the deployment, the user may opt to replace this AP. Such a user interface may include a map of the floor plan of the deployment and may indicate the areas of poor location accuracy, as well as the factor(s) 312 affecting these areas. In further embodiments, location accuracy assessment process 248 may initiate an automatic remediation action. For example, if the wireless channel used for the locating is suspected of being the cause of the poor performance, process 248 may reconfigure the affected APs or antennae to use a different channel.

Figure 7:
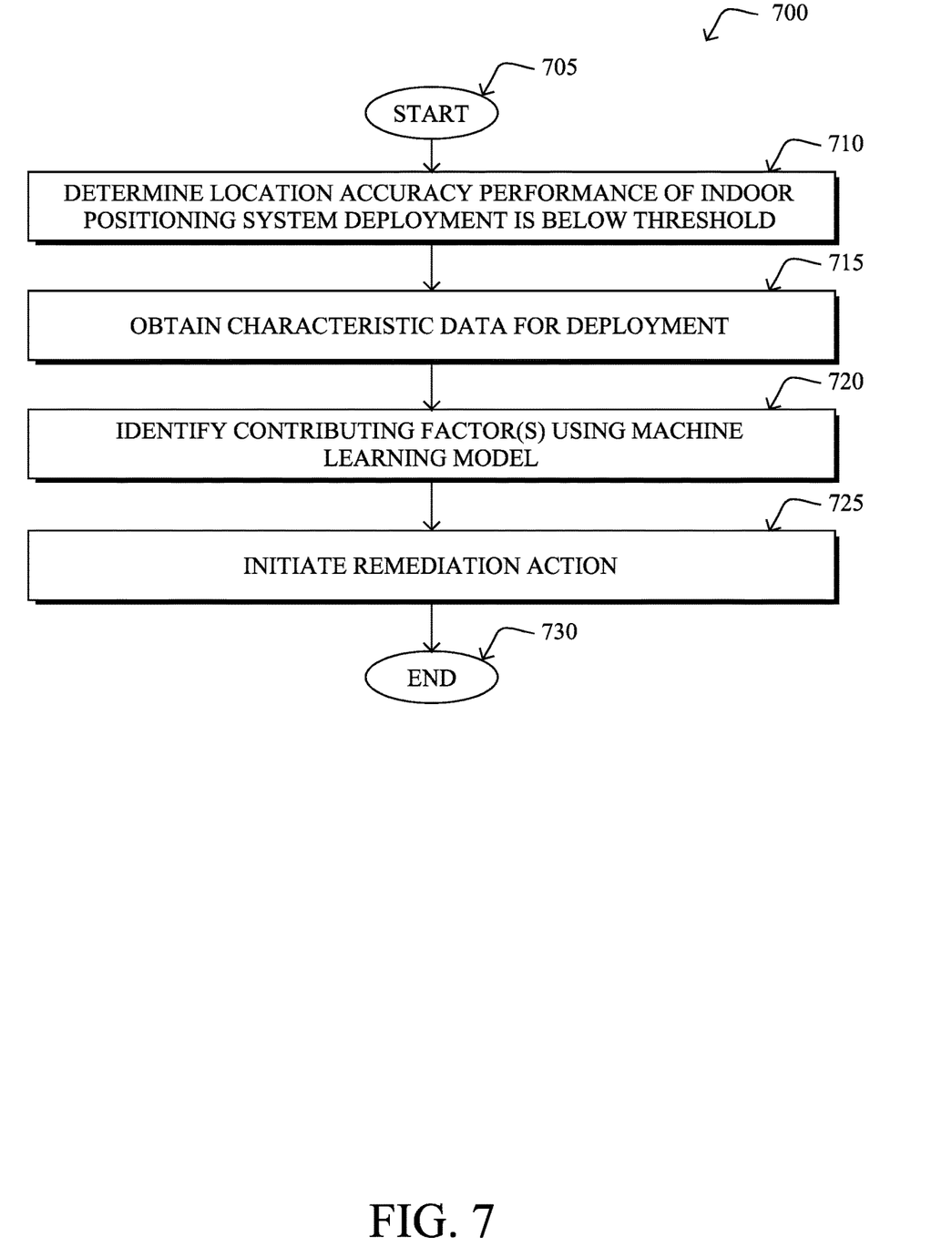

FIG. 7 illustrates an example simplified procedure for performing location accuracy assessment and remediation for an indoor positioning system deployment, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may determine that location accuracy performance of an indoor positioning system deployment is below a predefined threshold. For example, if the deployment is expected to achieve location accuracy between 1-3 meters, test measurements taken that are outside of this range may be considered to be "bad." Further thresholds can also be used to define intermediate degrees of accuracy between "good" and "bad," such as a "fair" categorization. In some embodiments, the threshold can be derived from a knowledge base generated from characteristic data from any number of indoor positioning system deployments (e.g., based on an average expected performance across deployments, etc.).

At step 715, as detailed above, the device may obtain characteristic data for the indoor positioning system deployment. For example, assume that location measurements are taken with respect to one or more devices at known locations. Any information available from the deployment may be collected as characteristic data and reported to the device for analysis. For example, such characteristic data may include, but is not limited to, information about the APs in the deployment (e.g., AP locations, AP distances, software and/or hardware configurations, AP calibrations, etc.), antennae characteristics (e.g., number of antennae used for positioning, wireless channels in use, other calibration information, etc.), RSSI information, AoA phase measurements, radio frequency interference, communication issues, combinations thereof, or the like.

At step 720, the device may identify, using het characteristic data as input to a machine learning model, one or more contributing factors from the characteristic data for the location accuracy performance of the indoor positioning system deployment being below the predefined threshold, as described in greater detail above. Such a model may be trained, for example, by labeling location measurements with accuracy tags, based on how close the measurements were to the actual locations of a device, and any number of characteristics of one or more deployments. In some embodiments, the device may also leverage a common factors knowledge base to weight the factors, based on observations made to any number of other deployments. For example, if it is commonly observed that a certain RSSI distribution leads to poor location accuracy in other deployments, this factor may be weighted more heavily by the device when identifying the contributing factors for the poor accuracy in the deployment under analysis.

At step 725, as detailed above, the device may initiate a remediation action based on the identified one or more contributing factors for the location accuracy performance of the indoor positioning system deployment being below the predefined threshold. In some embodiments, the remediation action may entail providing an identification of the identified factor(s) to a user interface, thereby allowing a technician or other user to effect a change to the deployment. In other embodiments, the remediation action can be implemented by the device automatically, such as causing an AP or AP controller to is update its software, changing a configuration of an AP (e.g., the orientation of the AP to improve accuracy), AP controller, or antenna, or the like. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identifications of the reason(s) why location accuracy in an indoor positioning system deployment is not meeting the expected degree of performance for the deployment.

While there have been shown and described illustrative embodiments that provide for location accuracy assessment and remediation for an indoor positioning system deployment, it is to be understood that various other adaptations and modifications may be made within the spirit and scope of the embodiments herein. For example, while certain embodiments are described herein with respect to using certain models for purposes of analysis, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the is embodiments herein. Therefore, it is the object of the appended claims to cover all such variations and modifications as come within the true spirit and scope of the embodiments herein.

What is claimed is:

1. A method comprising:
    determining, by a node, that location accuracy performance of an indoor positioning system deployment is below a predefined threshold, wherein an indoor positioning system associated with the indoor positioning system deployment is configured to estimate a location of one or more mobile devices inside of a building using measurements collected by the indoor positioning system, and the location accuracy performance is a distance range indicating how accurate the indoor positioning system is in estimating the location of one or more mobile devices in the building;
    assigning, by the node, a performance category among a plurality of predefined performance categories to the location accuracy performance of the indoor positioning system deployment according to a plurality of predefined thresholds;
    in response to determining that, based on the assigned performance category, the location accuracy performance is below a predefined threshold of the plurality of predefined thresholds:
        obtaining, by the node, characteristic data for the indoor positioning system deployment;
        identifying, by the node and by using the characteristic data as input to a machine learning model, one or more contributing factors from the characteristic data for the location accuracy performance of the indoor positioning system deployment being below the predefined threshold; and
        initiating, by the node, a remediation action based on the identified one or more contributing factors for the location accuracy performance of the indoor positioning system deployment being below the predefined threshold.

2. The method as in claim 1, wherein the one or more contributing factors comprise at least one of: received signal strength indicator (RSSI) quality, angle of arrival (AoA) phase measurements, radio frequency interference, or access point or antenna calibration.

3. The method as in claim 1, wherein the machine learning model is a decision tree classifier.

4. The method as in claim 1, wherein initiating the remediation action comprises:
    sending an indication of the identified one or more contributing factors to a user interface, or causing a configuration change to be made to a wireless access point in a network.

5. The method as in claim 1, further comprising:
    populating, by the node, a knowledge base of contributing factors associated with poor location accuracy performance identified from a plurality of indoor positioning system deployments; and
    using, by the node, the knowledge base to weight the identified one or more contributing factors.

6. The method as in claim 1, further comprising:
    training, by the node, the machine learning model using a set of locations computed by one or more indoor positioning system deployments that are labeled with accuracy tags, based on known device locations.

7. The method as in claim 1, wherein the characteristic data comprises a floor plan and wireless access point locations on the floor plan.

8. The method as in claim 1, wherein the one or more contributing factors comprises a particular wireless channel, and wherein initiating the remediation action comprises:
    sending, by the node, an instruction that causes the indoor positioning system deployment to use a different channel than the particular wireless channel for determining locations.

9. The method as in claim 1, further comprising:
    performing, by the node, coarse-grained analysis by using unsupervised learning to identify any misbehaving access points in the deployment; and
    performing, by the node, fine-grained analysis of the characteristic data using the machine learning model, wherein the machine learning model is a supervised learning model.

10. An apparatus comprising:
    one or more network interfaces;
    a processor coupled to the network interfaces and configured to execute one or more processes; and
    a memory configured to store a process executable by the processor, the process when executed configured to:
        determine that location accuracy performance of an indoor positioning system deployment is below a predefined threshold, wherein an indoor positioning system associated with the indoor positioning system deployment is configured to estimate a location of one or more mobile devices inside of a building using measurements collected by the indoor positioning system, and the location accuracy performance is a distance range indicating how accurate the indoor positioning system is in estimating the location of one or more mobile devices in the building;
        assign a performance category among a plurality of predefined performance categories to the location accuracy performance of the indoor positioning system deployment according to a plurality of predefined thresholds;
        in response to determining that, based on the assigned performance category, the location accuracy performance is below a predefined threshold of the plurality of predefined thresholds: obtain characteristic data for the indoor positioning system deployment;
        identify, using the characteristic data as input to a machine learning model, one or more contributing factors from the characteristic data for the location accuracy performance of the indoor positioning system deployment being below the predefined threshold; and
        initiate a remediation action based on the identified one or more contributing factors for the location accuracy performance of the indoor positioning system deployment being below the predefined threshold.

11. The apparatus as in claim 10, wherein the one or more contributing factors comprise at least one of: received signal strength indicator (RSSI) quality, angle of arrival (AoA) phase measurements, radio frequency interference, or access point or antenna calibration.

12. The apparatus as in claim 10, wherein the machine learning model is a decision tree classifier.

13. The apparatus as in claim 10, wherein the apparatus initiates the remediation action by:
    sending an indication of the identified one or more contributing factors to a user interface.

14. The apparatus as in claim 10, wherein the process when executed is further configured to:
    populate a knowledge base of contributing factors associated with poor location accuracy performance identified from a plurality of indoor positioning system deployments; and
    use the knowledge base to weight the identified one or more contributing factors.

15. The apparatus as in claim 14, wherein the predefined threshold is derived from the knowledge base.

16. The apparatus as in claim 10, wherein the process when executed is further configured to:
    train the machine learning model using a set of locations computed by one or more indoor positioning system deployments that are labeled with accuracy tags, based on known device locations.

17. The apparatus as in claim 10, wherein the one or more contributing factors comprises a particular wireless channel, and wherein the apparatus initiates the remediation action by:
    send an instruction that causes the indoor positioning system deployment to use a different channel than the particular wireless channel for determining locations.

18. The apparatus as in claim 10, wherein the process when executed is further configured to:
    perform coarse-grained analysis by using unsupervised learning to identify any misbehaving access points in the deployment; and
    perform fine-grained analysis of the characteristic data using the machine learning model, wherein the machine learning model is a supervised learning model.

19. A tangible, non-transitory, computer-readable medium storing program instructions that cause a node in a network to execute a process comprising:
    determining, by the node, that location accuracy performance of an indoor positioning system deployment is below a predefined threshold, wherein an indoor positioning system associated with the indoor positioning system deployment is configured to estimate a location of one or more mobile devices inside of a building using measurements collected by the indoor positioning system, and the location accuracy performance is a distance range indicating how accurate an indoor positioning system is in estimating the location of one or more mobile devices in the building;
    assigning, by the node, a performance category among a plurality of predefined performance categories to the location accuracy performance of the indoor positioning system deployment according to a plurality of predefined thresholds;
    in response to determining that, based on the assigned performance category, the location accuracy performance is below a predefined threshold of the plurality of predefined thresholds:
        obtaining, by the node, characteristic data for the indoor positioning system deployment;
        identifying, by the node and by using the characteristic data as input to a machine learning model, one or more contributing factors from the characteristic data for the location accuracy performance of the indoor positioning system deployment being below the predefined threshold; and
        initiating, by the node, a remediation action based on the identified one or more contributing factors for the location accuracy performance of the indoor positioning system deployment being below the predefined threshold.

\* \* \* \* \*

UNITED STATES PATENT AND TRADEMARK OFFICE
CERTIFICATE OF CORRECTION

PATENT NO. : 10,588,110 B2
APPLICATION NO. : 16/029000
DATED : March 10, 2020
INVENTOR(S) : Abhishek Mukherji et al.

Page 1 of 2

It is certified that error appears in the above-identified patent and that said Letters Patent is hereby corrected as shown below:

In the Specification

Column 1, Line 62, please amend as shown:
an indoor positioning system deployment is below a Column 4, Line 21, please amend as shown:
resentations in a network-based architecture. In particular, Column 4, Line 62, please amend as shown:
months (e.g., seasonal changes of an outdoor environ- Column 5, Line 37, please amend as shown:
Cisco Systems, Inc. another operating system, etc.), Column 6, Line 11, please amend as shown:
eters a,b,c such that the number of misclassified points is

Column 6, Line 53, please amend as shown:
may refer to the number of times the model predicted good Column 8, Line 2, please amend as shown:
The device initiates a remediation action based on the Column 9, Line 14, please amend as shown:
measurements are within 1-3 meters of the actual device Column 12, Line 24, please amend as shown:
or AP controller to update its software, changing a Signed and Sealed this
Thirtieth Day of June, 2020

Andrei Iancu
*Director of the United States Patent and Trademark Office*

Column 12, Line 64, please amend as shown:
embodiments herein. Therefore, it is the object of the